Patented Aug. 5, 1941

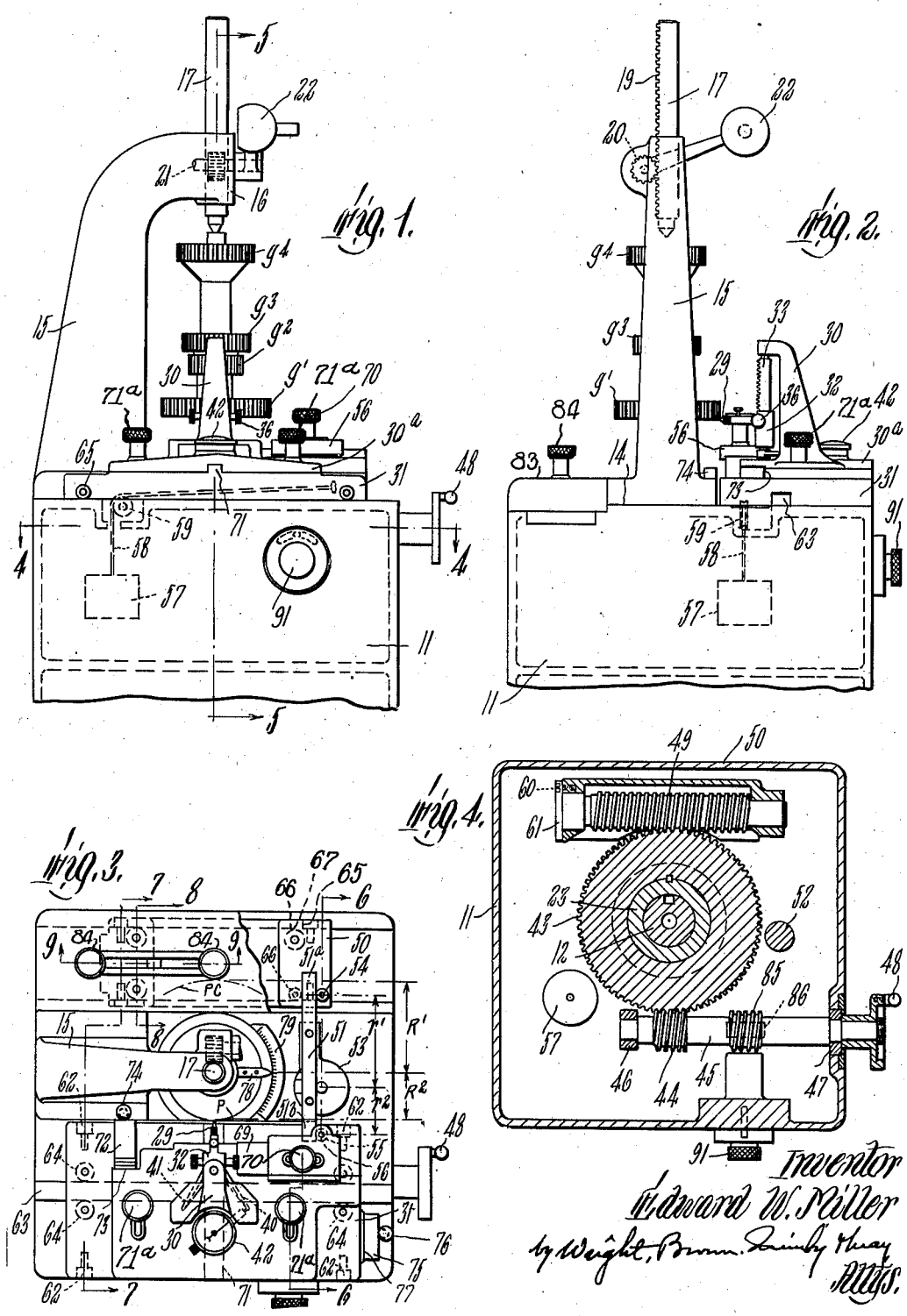

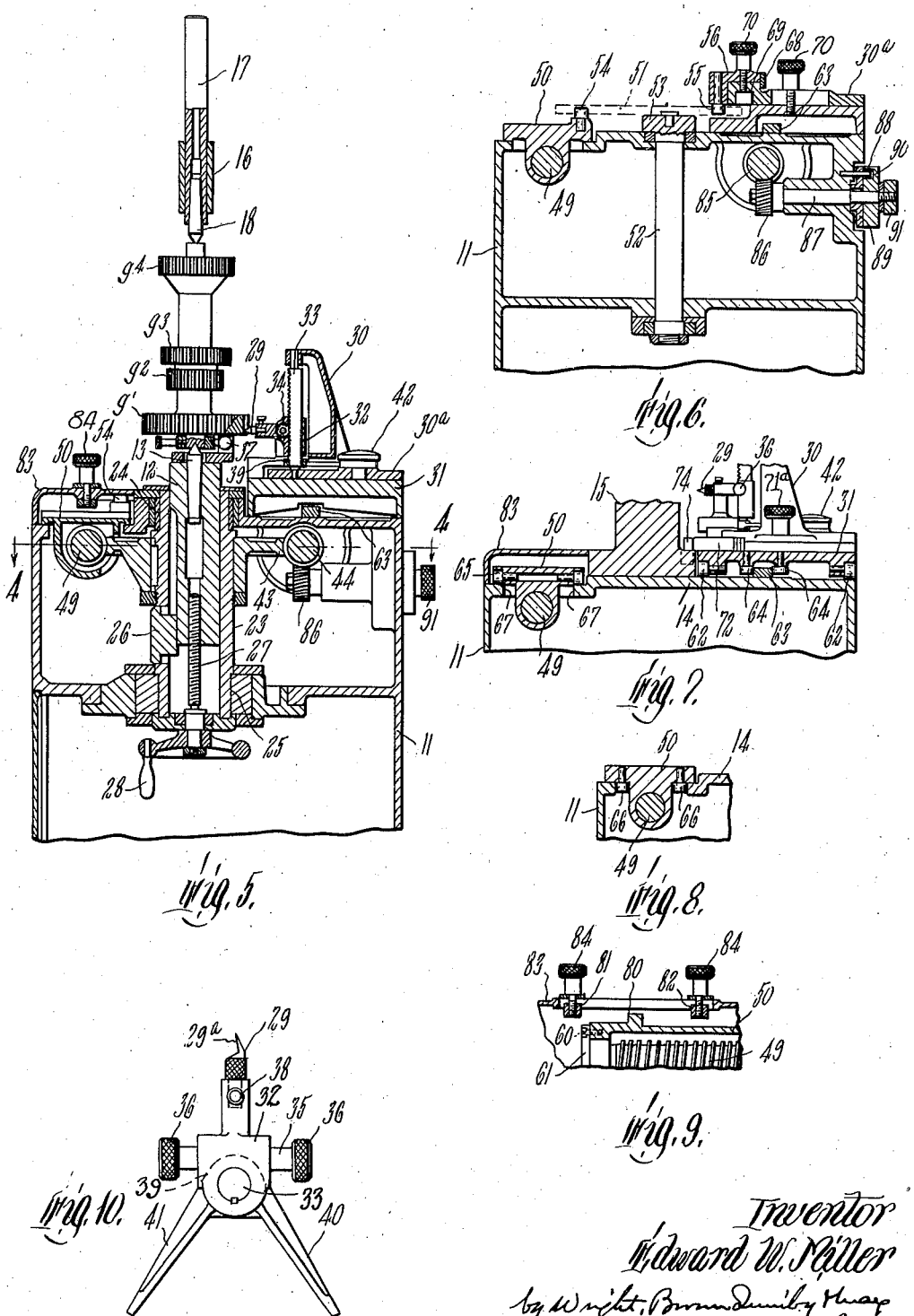

2,251,339

UNITED STATES PATENT OFFICE 2,251,339

INVOLUTE CURVE TESTING MACHINE

Edward W. Miller, Springfield, Vt., assignor to The Fellows Gear Shaper Company, Springfield, Vt., a corporation of Vermont Application August 29, 1939, Serial No. 292,428

17 Claims. (Cl. 33—174)

The present invention is concerned with machines for testing the curves of gear tooth faces and other machine elements or parts having surfaces of involute or other curvature, and measuring quantitatively any errors in such curved surfaces and the locations of inaccurate portions thereof. It is of the same type as the involute measuring machine disclosed in my patent entitled Involute measuring machine, No. 2,171,589 granted September 5, 1939, and embodies improvements in or modifications of the invention disclosed therein, including means for rotating the test piece about the center of the base circle of its involute curve, and means for causing traverse of a pointer or feeler in a line tangent to such base circle, together with provisions for adjustment of the feeler or pointer, and its path of travel, to conform with base circles of different diameters within a wide range. As compared with the machine of my said prior patent, the present invention has for its objects, to accommodate a wide range and variety of test pieces in the same machine, to make quickly and easily adjustments of the work holding and measuring parts of the machine to different test pieces and different parts of the same test piece, to provide means for eliminating backlash between the cooperating moving parts, and to provide a machine of simplified construction in some respects.

The principles and novel characteristics of the invention are explained in the following specification with reference to drawings illustrating one embodiment. In these drawings, Fig. 1 is a front elevation of the machine embodiment referred to;

Fig. 2 is a side elevation as seen from the left of Fig. 1;

Fig. 3 is a plan view of the machine;

Fig. 4 is a horizontal section taken on line 4—4 of Figs. 1 and 5;

Fig. 5 is a vertical section taken on line 5—5 of Fig. 1 looking in the direction of the arrows;

Figs. 6 and 7 are vertical sections taken on lines 6—6 and 7—7 respectively of Fig. 3, showing the upper portion of the machine base and the moving parts mounted thereon;

Figs. 8 and 9 are detail sections taken on lines 8—8 and 9—9 respectively of Fig. 3;

Fig. 10 is a plan view on a larger scale of the pointer or feeler, its holder, and the associated members by which movements of the feeler operate a measuring indicator.

Like reference characters designate the same parts wherever they occur in all the figures.

The base 11 of the machine contains an upright rotatable work spindle 12 in the end of which a tapered center 13 is mounted; and is constructed with a top wall or table portion 14 on which is mounted a rising post 15. The post is at one side of the axis of spindle 12 and is formed with an offset upper end overhanging the spindle and provided with a guideway 16 in which a bar 17 is adapted to slide endwise. This bar carries a center 18 in axial alinement with the spindle 12 and center 13, and the guideway 16 is arranged to confine the movements of the bar to a path in or parallel to that axis.

The slide bar or upper center carrier 17 is provided with a series of rack teeth 19 along one side, with which meshes a pinion 20 on a shaft 21 mounted in bearings in the end portion of the post 15. A weighted arm 22 is secured to the shaft 21 and serves not only as means for turning the pinion to raise and lower the center holder when the work pieces are changed, but also as a means to apply pressure and maintain close engagement between the centers and the work piece.

Spindle 12 is contained with provision for endwise movement in a sleeve or quill 23 which rotates in bearings 24 and 25 in the machine base. A key 26 secured to the sleeve passes into a keyway in the spindle. A screw 27, having a rotative and end thrust bearing in the end of the sleeve, and provided with a hand wheel and handle 28 on its lower end, is threaded into the spindle and serves as means for raising and lowering it.

A pointer or feeler 29 is supported by a bracket 30 having a base 30a which is secured, with provisions for adjustment toward and away from the axis of the spindle 12, on a feeler carriage or slide 31 mounted on the table 14 with capacity to move in a guided rectilinear horizontal path on one side of the spindle. The function of the feeler is to bear on the curved face being tested and to detect departures from the true prescribed curvature of such surface. It is formed to make point contact at its extremity with the curve being tested and is mounted in a holder 32 which has a sliding, non-rotative, engagement with a rack bar 33 pivotally supported at its opposite end by the bracket 30 in a position parallel to the spindle axis. A pinion 34 meshes with the teeth of the rack bar and is mounted on a shaft 35, which shaft is rotatable in the feeler holder and is equipped with knobs 36 whereby it may be rotated.

One of the novel features of this invention is the ability to accommodate a wide variety of different test pieces, due to the adjustments provided for the spindle 12, the center holder 17, and the feeler. As shown in the drawings, these parts are adjusted for testing the lowest unit $g'$ of a cluster gear of the type used in automobile transmissions. By raising the feeler holder within the limits of its possible adjustment, or by lowering the spindle and cooperating center, the gear unit $g^2$ may be tested. When both the centers are lowered and the feeler raised, the unit $g^3$ may be tested; and by reversing the piece between the centers and making appropriate adjustments, the uppermost unit $g^4$ may be tested. Both the spindle and the holder 17 have wide limits of adjustment, permitting pieces much shorter axially than the one here shown to be mounted in the machine, as well as somewhat longer pieces. Parts of the same curved surface in different planes perpendicular to the axis may be likewise tested by making similar adjustments. The weighted arm 22 is connected with shaft 21 by means of known character, such as a squared socket and tenon connection, a ratchet type clutch or clamp, etc., so that the arm may be caused to exert downward pressure on the holder 17 whatever may be the position of this holder in its range of travel, when engaging a test piece of any length. The pressure thereby exerted between the centers and the piece makes it unnecessary in many cases to use a driving dog for transmitting torque from the spindle to the test piece. But dogs may be used when necessary, and one is shown in Fig. 5 at 37, consisting of a projection from a collar secured to the test piece entering a notch in a lug secured to the spindle.

Another feature of the invention consists in means for enabling curves on the opposite sides of a test piece, such as the opposite sides of a gear tooth, to be measured without reversing the test piece and by a simple manipulation. The feeler 29 is made with a shank fitted rotatably in a socket in the holder 32, whereby it may be rotated to enable its extremity to bear laterally against either the right hand or left hand side of the test piece. A set screw 38 secures it in either position. There is secured, and preferably keyed, to the lower end of the pivoted rack bar 33 a collar 39, from which two diverging arms 40 and 41 project. Midway between the neutral position of the arms a dial indicator 42 of well known character is pivoted on the base 30a of the bracket 30 so that its radially projecting plunger, by which motion is transmitted through a multiplying mechanism to an indicating hand, may be brought into engagement with either arm. Fig. 3 shows it so engaged with the right hand arm 40 for measuring the aberrations of the right hand face of a gear tooth. By rotating it approximately 90° to the left, it may be brought into similar engagement with the left hand arm 41, for measuring the left hand face of a tooth when the feeler is appropriately positioned to bear on that tooth face.

The spindle is rotated, and the slide or feeler carriage 31 is simultaneously moved in a rectilinear path, by the following mechanism. A worm gear 43 is keyed to the sleeve 23 and meshes with a worm 44 on a shaft 45, which is mounted in bearings 46, 47, in the base and projects from the side of the base, carrying a hand wheel with handle 48 on its outer end. The worm gear meshes also with a worm 49 suspended from a drive slide 50 at the opposite side of the spindle from the feeler carrying slide 31 and, like the latter, guided to move in a rectilinear path. A transmission lever 51, which I prefer to call a ratio lever, is mounted pivotally on the base and is engaged with both slides in a manner to transmit motion from the drive slide 50 to the slide or carriage 31 when slide 50 is moved to the left with respect to Fig. 3.

The ratio lever comprises a bar, to which the numeral 51 is applied in Fig. 3, and a shaft 52 mounted in bearings in the base structure, as shown in Fig. 6, with its axis parallel to the spindle axis. The upper end of the shaft carries a head 53 on which the bar is laid and bolted. The bar forms two lever arms extending to opposite sides of its fulcrum axis, one of which, designated 51a, is engaged with a pin 54, which I call the drive pin, mounted on the slide 50 and the other arm, 51b, is engaged with a pin 55, which I call the ratio pin, carried by a pin bracket 56 which is secured to the base 30a of the feeler holding bracket. The engagement between the ratio lever and the pins 54 and 55 is on one side only of each. Pin 55 is held forcibly against arm 51b, and arm 51a is held forcibly against pin 54 by a weight 57 suspended by a cord 58 which passes around a guide pulley 59 in the base and is connected to the carriage 31 so that it applies force tending constantly to move this carriage to the left with respect to Figs. 1 and 3.

The teeth of the worm wheel 43 are made with face curves (preferably involute curves) like those of spur gear teeth, in a plane which includes the axes of the worms 44 and 49, such plane being perpendicular to the axis of the spindle. The thread convolutions of the worm 49 are of rack tooth profile conjugate to said gear tooth curves, in radial planes. Thus in the pitch plane of the worm and worm wheel, these elements have the characteristics of a rack and gear couple, whereby the worm is given a translative movement endwise, when the wheel is rotated, equal to the linear movement of the pitch circle of the gear in the plane previously referred to. A worm is used instead of a conventional rack in order to permit adjustment to position the slide 50 accurately and compensate for wear, by partial rotation of worm 49. Normally the worm does not rotate, and is held fast with respect to the slide by a screw 60 which passes through a slot in a flange 61 on the end of one of the worm trunnions into an adjacent part of the trunnion bearing. This screw clamps the flange against the end of the bearing and may be loosened to permit partial rotation of the screw. A circular series of tapped holes for the screw 60 may be provided in the trunnion bearing entirely surrounding the worm axis with a spacing shorter than the slot in flange 61, whereby the worm may be completely rotated and locked at any point of rotation.

The faces of the ratio lever arms 51a and 51b which bear on the pins 54 and 55 respectively are parallel to a line or lines radial to the fulcrum axis of the lever and are spaced from such radial line or lines by a distance, or distances, equal to the radii of the pins 54 and 55 respectively. Thus, when the pins are engaged with the lever, their axes, which are set parallel to the fulcrum axis, are likewise in one plane with such axis. Hence movement transmitted through the lever from one slide to the other is proportional to the ratio of the distances of the paths of the respective pins from the fulcrum axis in all degrees of angularity of the lever arms to these paths within the prescribed limits of movement of the parts of the machine. When these parts are in neutral position, the acting faces of the respective lever arms are preferably perpendicular to these paths; but they may be somewhat out of perpendicular without affecting the accuracy and range of operation of the machine.

The feeler carriage 31 is supported on the upper surface of the machine base by antifriction rolls 62 at opposite sides near its opposite ends. It is guided by a stationary bar 63 having parallel opposite sides which is secured to the base and is flanked by two pairs of guide rolls 64 on the under side of the carriage. The slide 50 is correspondingly supported on the top of the base by antifriction rolls 65 and guided by rolls 66 bearing on the opposite parallel edges 67 of an opening in the top wall of the base through which the housing and bearings for the worm 49 project from the slide.

The bracket 58 which carries the ratio lever pin 55 is adjustable on the feeler carriage in the direction of movement of the latter, being of angular formation and having a gib 68 to embrace a rib 69 on the feeler bracket base 30a, as best shown in Fig. 6. A screw 70 having a clamping shoulder overlying the pin bracket, passes through a slot in the bracket into threaded engagement with the rib 69, permitting adjustment of the bracket and clamping it wherever adjusted. The adjustment of this bracket, in connection with the adjustment of worm 49, previously described, permits an exact correlation of the main slide 50 and the feeler carriage with respect to one another and to the ratio lever.

The fulcrum shaft 52 is located with its axis at a distance from the path of the axis of pin 54 equal to the radius of the pitch circle on which the worm gear 43 coacts with worm 49. Referring to Fig. 3, an arc of this pitch circle is designated by the broken line PC. Its radius is designated by the distance $R'$. The perpendicular distance between the fulcrum axis and the path of the axis of pin 54 is designated $r'$. These distances, $R'$ and $r'$, are equal. When the machine is correctly set up for operation, the path P in which the contact point of the feeler 29 travels is at a distance $R^2$ from the work spindle which is equal to the distance $r^2$ between the path of the axis of pin 55 on the feeler carriage and the fulcrum axis of the ratio lever. The distances $R^2$ and $r^2$ may be altered equally and simultaneously by moving the bracket 30 toward and away from the spindle axis. Such movement is guided by a rib or bar 71 on the carriage or slide 31 (preferably perpendicular to the direction of movement of said carriage) which fits a slot in the under side of the bracket base 30a, as shown best in Fig. 1. Clamp screws 71a passing through slots in base 30a, to connection with the carriage, secure the adjustments of the feeler and ratio pin 55. This adjustment enables the feeler to be set in a path tangent to any circle coaxial with the work spindle, within limits, and causes its movement in such path under control of the ratio lever to be exactly equal to the linear movement of such tangent circle. The feeler may thus be brought into proper relationship to involute surfaces generated from base circles corresponding to any of such tangent circles, for testing the accuracy and measuring aberrations of such surfaces. Setting of the feeler accurately at known distances from the work spindle axis is accomplished by gauge blocks 72 laid on the carriage 31 between a shoulder 73 on the feeler bracket base 30a and a pin 74 set in the base of the post 15.

In order to ascertain the points of an involute curve where errors occur, it is necessary to start the measurement at a definite point on the curve and measure the rotation of the test piece. When the test curve originates at its base circle, the starting point is ordinarily placed at the point of origin. Hence the feeler point is located in that radius of the base circle which is perpendicular to the path of movement of the feeler point. A gauge block 75 of exactly correct thickness is placed between a pin 76 on the base and a shoulder 77 on the carriage 31 for thus locating the feeler. Thereafter, and before making the test, this gauge block is removed. Suitable provision is made to avoid interference with the carriage movement by stud 76, as by locating the stud sufficiently far from the carriage, or providing an opening in the carriage which can pass over the stud. An index 78 is carried by the work spindle in cooperation with a stationary circular scale 79 to measure the roll of the test piece, whereby the locations of aberrations detected by the feeler are exactly shown.

The feeler is formed with a back clearance on its contact side, as shown at 29a in Fig. 10, so that it will bear only at its extremity on the test piece. Its extremity must be ground back from time to time to compensate for wear; and such grinding not only shifts the contact point outwardly from the work spindle but also, by reason of the back clearance referred to, shifts it tangentially of the work spindle. To compensate for these displacements of the feeler contact point, the abutment pins 74 and 76 are mounted with provisions for turning about an eccentric axis and means are provided to prevent them from being turned accidentally. By this means, and without need of applying any corrections to the gauge blocks, correct location of the feeler is assured after grinding.

Some involute curves to be tested lie entirely outside of their base circles. This is the case with gears of which the tooth root diameter is larger than the base circle diameter. In such cases the feeler must be offset (i. e., displaced from the position shown in Fig. 3 far enough to clear the root circumference and the fillet, if any, at the root of the curve, and the surface to be tested offset or displaced correspondingly) when starting the measurements. The angle of offset is determined by the index 78 and scale 79. The same starting point for the measurement of all curves (such as the several teeth of a gear) having the same relationship to the same base circle is then established by means of stops, such as are shown in Fig. 9. A projection 80 on the main slide 50 travels between adjustable stops 81 and 82 mounted on a housing 83 which covers the main slide. These stops are connected with clamp screws 84 extending through a slot in the housing by means of which they may be shifted and secured in different positions.

An alternative stop means for the same purpose, shown in Figs. 1, 4, 5 and 6, consists of a worm 85 on the operating shaft 45 meshing with a gear 86 on a shaft 87 which passes through the front of the base. A pin 88 set into the base passes through a curved slot in a disk 89, which is keyed to shaft 87, and enters an arcuate recess in the inner face of a stop disk 90 which is loose on the shaft and may be clamped in adjusted position against disk 89 by a nut 91 screwed on shaft 87. The utmost limits of movement of the feeler carriage are established by the ends of the slot in the keyed disk 89, while the starting point for measurement of duplicate offset curves of any angle of offset is established by the adjustable stop 90.

The manner of use of the machine for measuring involute curves of either hand will be understood by those skilled in the art in the light of the foregoing description without further explanation. It needs only to be said that the ratio lever serves to propel the feeler carriage positively when measuring curves of one hand, and restrains the movement of the carriage under the influence of weight 57 when measuring curves of the opposite hand, in exact proportion to the ratio between the base circle of the curve being measured and the operating pitch circle of the driving gear 43.

The principles of the machine hereinbefore described may be embodied in various forms, structures and combinations, all within the scope of the protection which I seek. For the purpose of generic definition in the claims, applicable to other species of the invention as well as that herein disclosed, the spindle 12 is defined as a support or holder for the work or test piece; the overhanging post with its endwise movable bar 17 and center 16, as a work centering and steadying device cooperating with the work support; and the base 11 as generically a carriage support or table on which the main slide 50 and feeler carriage 31 are held and guided for movement in rectilinear paths relative to both supports and to each other, and on which the ratio lever 51 is pivoted. The drive pin 54 on the main slide and the ratio pin 55 on the feeler carriage are abutments, or abutting portions, of such slide and carriage which bear on one side only of the respective lever arms; and the weight 57 is a yielding force-applying means by which the carriage abutment is maintained in contact with the lever and the latter in contact with the slide abutment. Other yieldable force-applying means, such as springs, whether mechanical, pneumatic or of other nature, are equivalent to the weight within the scope of this invention.

What I claim and desire to secure by Letters Patent is:

1. An involute curve testing machine comprising a carriage support, a work support, means for effecting relative rotary movement between said work support and carriage support, a main slide and a feeler carriage mounted on said carriage support in guided engagement therewith for movement in paths tangential to circles concentric with the axis of such relative rotary movement, a ratio lever pivoted to the carriage support having an arm in abutting engagement at one side with a portion of the main slide and a second arm having abutting engagement at one side with a part of the feeler carriage, and yielding force-applying means acting on the carriage to maintain its abutting portion in engagement with the lever and the lever in engagement with the abutting portion of the main slide.

2. An involute curve testing machine as set forth in claim 1, in which the ratio lever is constituted by a shaft pivotally mounted in the carriage supporting part of the machine and lever arms secured to said shaft extending laterally therefrom.

3. An involute curve testing machine as set forth in claim 1, in which the ratio lever is constituted by a shaft pivotally mounted in the carriage supporting part of the machine and lever arms secured to said shaft extending laterally therefrom, each of said arms having a contact face parallel to a radial plane of the shaft for engagement with the abutting portion of the main slide or feeler carriage respectively.

4. An involute curve testing machine as set forth in claim 1, in which the ratio lever is constituted by a shaft pivotally mounted in the carriage supporting part of the machine and lever arms secured to said shaft extending laterally therefrom, each of said arms having a contact face parallel to a radial plane of the shaft for engagement with the abutting portion of the main slide or feeler carriage respectively, and in which the abutting portion of the main slide is a curved surface having a radius equal to the distance between the abutting face of the respective lever arms and the radial plane of the shaft which is parallel to such face.

5. In an involute testing machine of the type in which relative rotational and linear movements are caused to take place between a test piece having a surface of involute curvature and a feeler, in a plane perpendicular to the axis of the base circle of such involute curve, the feeler being in contact with the curved surface and the rectilinear component of motion being tangential to the said base circle; means for supporting the feeler comprising a bracket, a bar parallel to the axis of said base circle pivoted to the bracket to turn about a longitudinal axis and having a longitudinal series of teeth, a holder fitted to said bar with capacity for sliding endwise thereon, a feeler secured to said holder, and a pinion mounted rotatably in said holder in mesh with the teeth of said bar for shifting the holder lengthwise of the bar.

6. In an involute testing machine of the type in which relative rotational and linear movements are caused to take place between a test piece having a surface of involute curvature and a feeler, in a plane perpendicular to the axis of the base circle of such involute curve, the feeler being in contact with the curved surface and the rectilinear component of motion being tangential to the said base circle; means for supporting the feeler comprising a bracket, a bar parallel to the axis of said base circle pivoted to the bracket to turn about a longitudinal axis and having a longitudinal series of teeth, a holder fitted to said bar with capacity for sliding endwise thereon, a feeler secured to said holder, and a pinion mounted rotatably in said holder in mesh with the teeth of said bar for shifting the holder lengthwise of the bar, combined with an arm secured to said bar projecting laterally therefrom, and an indicator in association with said arm for showing movements thereof on an enlarged scale.

7. In an involute testing machine of the type in which relative rotational and linear movements are caused to take place between a test piece having a surface of involute curvature and a feeler, in a plane perpendicular to the axis of the base circle of such involute curve, the feeler being in contact with the curved surface and the rectilinear component of motion being tangential to the said base circle; a reversible measuring device for cooperating with either right hand or left hand curves, comprising a feeler holder, a feeler having a lateral curve-engaging point, reversibly mounted on the holder, two diverging arms in rigid motion transmitting connection with said holder, an indicator mounted between said arms in a manner permitting it to be shifted for actuation by either arm, and means for supporting said holder and indicator in operative relationship.

8. In a curve testing machine of the character described, a curve testing assemblage consisting of a bar mounted pivotally to turn about a longitudinal axis, a feeler holder mounted on said bar with provision for placement in different positions lengthwise of said bar, a feeler carried by said holder having a lateral contact point and being reversible to engage such point with surfaces at either side of the feeler, a pair of separated arms secured to the bar, an indicator mounted between said arms with provision for rotation to bring it into indicating relation with either arm, and means for holding said bar and indicator in operative relationship.

9. In an involute testing machine of the type in which relative rotational and linear movements are caused to take place between a test piece, having a surface of involute curvature, and a feeler, in a plane perpendicular to the axis of the base circle of such involute curve, the feeler being in contact with the curved surface and the rectilinear component of said movements being tangential to the said base circle; a feeler carriage relatively movable in a path coresponding with said tangential component, on which the feeler is mounted, and a positioning abutment for locating said carriage in said path with respect to the test piece before taking a measurement, said abutment being adjustable to compensate for changes of the position of the contact point of the feeler in consequence of wear.

10. In a machine as set forth in claim 9, the abutment consisting of an eccentrically mounted stud.

11. An involute curve testing machine comprising a supporting structure, a feeler carriage mounted on said structure for guided rectilinear movement thereon, a slide mounted for guided rectilinear movement on the supporting structure, a ratio lever pivoted to the supporting structure in abutting engagement with both said slide and said carriage for transmitting force from one to the other in a manner tending to cause movement of the part to which force is thus transmitted, a work holder associated with said supporting structure in a manner permitting relative angular movement of one relatively to the other about the axis of the work holder, a gear element secured to the spindle and a worm secured to the slide, said gear element and worm having teeth of involute gear and rack formation in the plane perpendicular to the axis of the spindle which includes the axis of the worm.

12. A testing machine as set forth in claim 13, in which the worm is angularly adjustable about its axis with respect to the slide.

13. An involute curve testing machine as set forth in claim 1, in which the abutting portion of the feeler carriage which engages the ratio lever is adjustably mounted on the feeler carriage with provision for being shifted in the general direction of the movement of said carriage.

14. In an involute gear testing machine, means for effecting angular and translative components of movement between a test piece having an involute surface and a feeler engaging such surface comprising a rectilinearly movable carriage on which the feeler is mounted, a support for said carriage, a slide rectilinearly movable on said support, a holder for pieces to be tested between which and the said supporting structure relative angular movement about the axis of the test piece is provided for, a gear wheel secured to said work holder, a worm carried by said slide meshing with said gear wheel and being adjustable about its own axis relatively to the slide, a ratio lever pivoted to said supporting structure having an arm in abutting engagement with said slide, and an abutment on said carriage engaged with an arm of said lever; the last named abutment being adjustable on the carriage lengthwise of the movement thereof.

15. In a machine of the character described having means for effecting relative rotational and rectilinear movement between a test piece having an involute surface and a feeler in contact with such surface, a carriage on which the feeler is mounted, a slide coupled to said carriage for effecting translative movement thereof simultaneously with rotary movement of the test piece and adjustable stop means for limiting the movements of said slide and for establishing the starting point of the testing procedure.

16. In an involute curve testing machine having a base, a work supporting spindle rotatably mounted on the base, and a feeler carriage, a gear element secured to the spindle, a driving worm meshed with said gear element, transmission means between the spindle and feeler carriage for imparting movement to the latter when the spindle is rotated, and means for limiting the movements of the carriage consisting of a worm rigidly connected with the before named worm, a gear in mesh with the second named worm, a shaft to which said gear is connected, a stationary stop element, and a cooperating stop element secured to said shaft.

17. In a machine of the character described having means for effecting relative rotational and rectilinear movement between a test piece having an involute surface and a feeler in contact with such surface, a carriage on which the feeler is mounted, a slide coupled to said carriage for effecting translative movement thereof simultaneously with rotary movement of the test piece, said slide having a projection, and adjustable stops mounted on a relatively stationary part of the machine at respectively opposite sides of said projection, crossing the path thereof, adapted to be set for limiting the movements of the slide and for establishing the starting point of the testing traverse.

EDWARD W. MILLER.

CERTIFICATE OF CORRECTION.

Patent No. 2,251,339. August 5, 1941.

EDWARD W. MILLER.

It is hereby certified that error appears in the printed specification of the above numbered patent requiring correction as follows: Page 5, first column, line 58, claim 12, for the claim reference numeral "13" read --11--; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.